US009698884B2

(12) United States Patent
Guey et al.

(10) Patent No.: US 9,698,884 B2
(45) Date of Patent: Jul. 4, 2017

(54) CONTROL SIGNALING IN A BEAMFORMING SYSTEM

(71) Applicant: MEDIATEK INC., Hsinchu (TW)

(72) Inventors: Jiann-Ching Guey, Hsinchu (TW); Chia-Hao Yu, Yilan County (TW); Ming-Po Chang, New Taipei (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 14/723,689

(22) Filed: May 28, 2015

(65) Prior Publication Data
US 2016/0087704 A1      Mar. 24, 2016

Related U.S. Application Data

(60) Provisional application No. 62/054,485, filed on Sep. 24, 2014.

(51) Int. Cl.
 H04B 7/06     (2006.01)
 H04W 74/08    (2009.01)
 H04W 72/04    (2009.01)

(52) U.S. Cl.
 CPC ...... H04B 7/0617 (2013.01); H04W 74/0833 (2013.01); H04W 72/046 (2013.01)

(58) Field of Classification Search
 None
 See application file for complete search history.

(56) References Cited

U.S. PATENT DOCUMENTS

| 7,453,946 B2 | 11/2008 | Sondur | 375/267 |
| 7,599,327 B2 | 10/2009 | Zhuang | 370/329 |
| 2002/0061768 A1* | 5/2002 | Liang | H04B 7/0617 455/561 |

(Continued)

FOREIGN PATENT DOCUMENTS

| CN | 101431355 A | 5/2009 |
| CN | 101431490 A | 5/2009 |

(Continued)

OTHER PUBLICATIONS

USPTO, Office Action for related U.S. Appl. No. 14/725,159 dated May 5, 2016 (26 pages).

(Continued)

Primary Examiner — Jenee Williams
(74) Attorney, Agent, or Firm — Imperium Patent Works; Zheng Jin

(57) ABSTRACT

A method of control signaling in a beamforming system is proposed. A base station allocates a first sets of DL control resource blocks for DL transmission to a plurality of user equipments (UEs) in a beamforming network. Each set of DL control resource blocks is associated with a corresponding set of beamforming weights. The base station also allocates a second sets of UL control resource blocks for UL transmission from the UEs. Each set of UL control resource blocks is associated with the same corresponding set of beamforming weights. The base station transmits cell and beam identification information using a set of control beams. Each control beam comprises a set of DL control resource block, a set of UL control resource block, and the corresponding set of beamforming weights.

21 Claims, 11 Drawing Sheets

(56) References Cited

U.S. PATENT DOCUMENTS

| | | | |
|---|---|---|---|
| 2002/0146029 A1* | 10/2002 | Kavak | H04B 7/0617 370/441 |
| 2005/0047347 A1* | 3/2005 | Lee | H04L 1/20 370/241 |
| 2005/0047530 A1* | 3/2005 | Lee | H04B 7/086 375/343 |
| 2005/0105485 A1* | 5/2005 | Cleveland | H04B 7/0617 370/320 |
| 2005/0136980 A1* | 6/2005 | Kim | H01Q 1/246 455/562.1 |
| 2005/0239475 A1* | 10/2005 | Voltolina | H04W 64/00 455/456.1 |
| 2005/0243940 A1* | 11/2005 | Huh | H04L 25/022 375/260 |
| 2006/0276229 A1* | 12/2006 | Braun | H04W 16/28 455/562.1 |
| 2006/0292994 A1* | 12/2006 | Oura | H04B 7/086 455/67.16 |
| 2007/0037529 A1 | 2/2007 | Nagai et al. | 455/101 |
| 2007/0135052 A1* | 6/2007 | Park | H04B 7/0617 455/63.1 |
| 2007/0263743 A1 | 11/2007 | Lee et al. | 375/267 |
| 2008/0081671 A1 | 4/2008 | Wang et al. | 455/562.1 |
| 2008/0303508 A1 | 12/2008 | Kwak et al. | 324/76.52 |
| 2009/0116569 A1 | 5/2009 | Jin | 375/260 |
| 2009/0161772 A1 | 6/2009 | Sawahashi et al. | 375/260 |
| 2009/0196203 A1 | 8/2009 | Taira et al. | 370/280 |
| 2009/0203405 A1 | 8/2009 | Horneman et al. | 455/562.1 |
| 2009/0225879 A1 | 9/2009 | Kloos et al. | 375/260 |
| 2009/0252112 A1 | 10/2009 | Shimomura et al. | 370/330 |
| 2009/0322614 A1* | 12/2009 | Na | H01Q 3/30 342/377 |
| 2010/0020702 A1* | 1/2010 | Wong | H04L 41/5009 370/252 |
| 2010/0111226 A1* | 5/2010 | Ko | H04B 7/0639 375/299 |
| 2010/0142390 A1* | 6/2010 | Sun | H04B 7/0452 370/252 |
| 2010/0142466 A1 | 6/2010 | Palanki et al. | 370/329 |
| 2010/0177723 A1 | 7/2010 | Kim et al. | 370/329 |
| 2011/0044408 A1 | 2/2011 | Ahmad | 375/340 |
| 2011/0045792 A1* | 2/2011 | Na | H04B 7/0626 455/272 |
| 2011/0170521 A1* | 7/2011 | Wang | H04B 7/0617 370/336 |
| 2011/0182376 A1* | 7/2011 | Abe | H04L 5/0023 375/260 |
| 2011/0216734 A1 | 9/2011 | Yu | 370/330 |
| 2011/0280333 A1 | 11/2011 | Yang et al. | 375/295 |
| 2012/0027111 A1* | 2/2012 | Vook | H04B 7/0452 375/267 |
| 2012/0039321 A1 | 2/2012 | Ghosh et al. | 370/338 |
| 2012/0182895 A1* | 7/2012 | Jwa | H04L 5/0048 370/252 |
| 2012/0307726 A1* | 12/2012 | Pi | H04J 11/0069 370/328 |
| 2013/0051302 A1 | 2/2013 | Kim | 370/312 |
| 2013/0051364 A1* | 2/2013 | Seol | H04W 16/28 370/331 |
| 2013/0064239 A1* | 3/2013 | Yu | H04W 72/046 370/350 |
| 2013/0102345 A1 | 4/2013 | Jung | 455/513 |
| 2013/0156120 A1 | 6/2013 | Josiam et al. | 375/260 |
| 2013/0195042 A1* | 8/2013 | Taori | H04W 72/042 370/329 |
| 2013/0279403 A1* | 10/2013 | Takaoka | H04L 5/0035 370/328 |
| 2013/0322563 A1 | 12/2013 | Van Zelst et al. | 375/295 |
| 2013/0336133 A1 | 12/2013 | Carbonelli et al. | 370/252 |
| 2014/0177607 A1* | 6/2014 | Li | H04W 74/0833 370/336 |
| 2014/0302856 A1 | 10/2014 | Nory et al. | 455/437 |
| 2014/0348271 A1 | 11/2014 | Ma et al. | 375/340 |
| 2015/0282178 A1 | 10/2015 | Kim et al. | 370/329 |
| 2015/0365814 A1* | 12/2015 | El Ayach | H04W 16/28 370/254 |
| 2016/0043781 A1* | 2/2016 | Cho | H04L 5/0051 342/373 |
| 2016/0072654 A1 | 3/2016 | Choi et al. | 370/329 |
| 2016/0100373 A1* | 4/2016 | Chen | H04L 27/2613 370/350 |
| 2016/0197659 A1* | 7/2016 | Yu | H04W 16/28 370/335 |
| 2016/0212631 A1* | 7/2016 | Shen | H04W 16/28 |

FOREIGN PATENT DOCUMENTS

| | | |
|---|---|---|
| CN | 101459453 A | 6/2009 |
| CN | 101523736 A | 9/2009 |
| CN | 101674119 A | 3/2010 |
| CN | 101803320 A | 8/2010 |
| CN | 101931896 A | 12/2010 |
| CN | 103475606 A | 12/2013 |
| CN | 103782524 A | 5/2014 |
| CN | 103891161 A | 6/2014 |
| CN | 104052535 A | 9/2014 |
| WO | WO2011143634 A1 | 11/2011 |

OTHER PUBLICATIONS

USPTO, Office Action for related U.S. Appl. No. 14/725,183 dated Jul. 7, 2016 (12 pages).

International Search Report and Written Opinion of International Search Authority for PCT/CN2015/089705 dated Nov. 26, 2015 (11 pages).

International Search Report and Written Opinion of International Search Authority for PCT/CN2015/087893 dated Dec. 11, 2015 (11 pages).

International Search Report and Written Opinion of International Search Authority for PCT/CN2015/089704 dated Dec. 21, 2015 (13 pages).

USPTO, Office Action for related U.S. Appl. No. 14/725,159 dated Oct. 8, 2015 (22 pages).

USPTO, Office Action for related U.S. Appl. No. 14/725,183 dated Nov. 5, 2015 (13 pages).

International Search Report and Written Opinion of International Search Authority for PCT/CN2015/087315 dated Nov. 17, 2015 (11 pages).

International Search Report and Written Opinion of International Search Authority for PCT/CN2015/CN2015/087894 dated Nov. 6, 2015 (11 pages).

USPTO, Office Action for related U.S. Appl. No. 14/725,159 dated Sep. 13, 2016 (36 pages).

USPTO, Office Action for related U.S. Appl. No. 14/723,706 dated Feb. 13, 2017 (14 pages).

* cited by examiner

CONTROL SIGNALING IN A BEAMFORMING SYSTEM

CROSS REFERENCE TO RELATED APPLICATIONS

This application claims priority under 35 U.S.C. §119 from U.S. Provisional Application No. 62/054,485, entitled "Control Signaling in a Beamforming System," filed on Sep. 24, 2014, the subject matter of which is incorporated herein by reference.

TECHNICAL FIELD

The disclosed embodiments relate generally to wireless communication, and, more particularly, to control signaling and synchronization in a Millimeter Wave (mmW) beamforming system.

BACKGROUND

The bandwidth shortage increasingly experienced by mobile carriers has motivated the exploration of the under-utilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

With recent advances in mmW semiconductor circuitry, mmWave wireless system has become a promising solution for real implementation. However, the heavy reliance on directional transmissions and the vulnerability of the propagation environment present particular challenges for the mmWave network. In general, a cellular network system is designed to achieve the following goals: 1) Serve many users with widely dynamical operation conditions simultaneously; 2) Robust to the dynamics in channel variation, traffic loading and different QoS requirement; and 3) Efficient utilization of resources such as bandwidth and power. Beamforming adds to the difficulty in achieving these goals.

Traditional multiple point-to-point protocols used in IEEE 802.11ad beamforming systems are no longer suitable for cellular network in which the relationship between the base station and mobile devices is point to multi-point. In cellular networks, the UL control signaling transmission needs to be organized and be protected at certain level. The base station should help to maintain the quality of UL control signaling transmission. More specifically, IEEE 802.11ad is more suitable for isolated hot spot development but not designed for mobility scenario in cellular network. Non-harmonized beacon transmission interval among access points (APs) introduces higher network discovery latency, which resulting in long network reselection time and thus harmful for service continuity.

A robust control-signaling scheme is thus required to facilitate the beamforming operation in a challenging mmWave environment.

SUMMARY

A method of control signaling in a beamforming system is proposed. A set of coarse TX/RX control beams are provisioned indefinitely and repeatedly in a cellular system mainly for control purpose. The control beams cover the entire cell coverage area with moderate beamforming gain and provide low rate control signaling to facilitate high rate data communication.

In one embodiment, a base station allocates a first sets of DL control resource blocks for DL transmission to a plurality of user equipments (UEs) in a beamforming network. Each set of DL control resource blocks is associated with a corresponding set of beamforming weights. The base station also allocates a second sets of UL control resource blocks for UL transmission from the UEs. Each set of UL control resource blocks is associated with the same corresponding set of beamforming weights. The base station transmits cell and beam identification information using a set of control beams. Each control beam comprises a set of DL control resource block, a set of UL control resource block, and the corresponding set of beamforming weights. A collection of the beamforming weights of the set of control beams create a radiation pattern that covers an entire service area of a cell.

In another embodiment, a user equipment (UE) receives control beam transmission from a base station using a set of control beams in a beamforming network. Each control beam comprises a set of DL control resource blocks, a set of UL control resource blocks, and an associated set of beamforming weights. The UE selects a control beam for establishing a connection with the base station. The UE then performs random access with the base station using the selected control beam.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
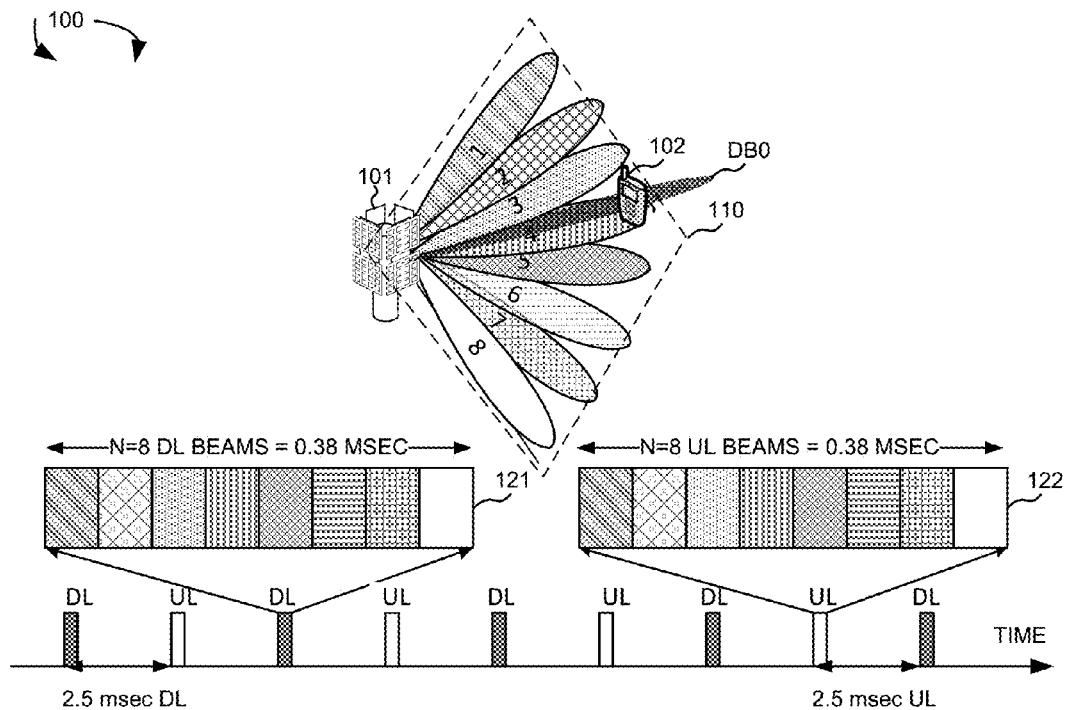
FIG. 1 illustrates control beams in a beamforming system in accordance with one novel aspect.

FIG. 1 illustrates control beams in a beamforming Millimeter Wave (mmWave) cellular network 100 in accordance with one novel aspect. Beamforming network 100 comprises a base station BS 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. For control purpose, a set of coarse TX/RX control beams are provisioned by the base station in the cellular system. The set of control beams may be periodically configured or occur indefinitely and repeatedly in order known to the UEs. The set of control beams covers the entire cell coverage area with moderate beamforming gain. Each control beam broadcasts a minimum amount of beam-specific information similar to Master Information Block or System Information Block (MIB or SIB) in LTE. Each beam may also carry UE-specific control or data traffic. Each beam transmits a set of known signals for the purpose of initial time-frequency synchronization, identification of the control beam that transmits the signals, and measurement of radio channel quality for the beam that transmits the signals.

In the example of FIG. 1, BS 101 is directionally configured with multiple cells, and each cell is covered by a set of coarse TX/RX control beams. In one embodiment, cell 110 is covered by eight control beams CB0 to CB7. Each control beam comprises a set of downlink resource blocks, a set of uplink resource blocks, and a set of associated beamforming weights with moderate beamforming gain. In the example of FIG. 1, different control beams are time division multiplexed (TDM) in time domain. A downlink subframe 121 has eight DL control beams occupying a total of 0.38 msec. An uplink subframe 122 has eight UL control beams occupying a total of 0.38 msec. The interval between the DL subframe and the UL subframe is 2.5 msec. The set of control beams are lower-level control beams that provide low rate control signaling to facilitate high rate data communication on higher-level data beams. For example, UE 102 performs synchronization with BS 101 via control beam CB4, and exchanges data traffic with BS 101 via dedicated data beam DB0. The control beam and data beam architecture provides a robust control-signaling scheme to facilitate the beamforming operation in mmWave cellular network systems.

Figure 2:
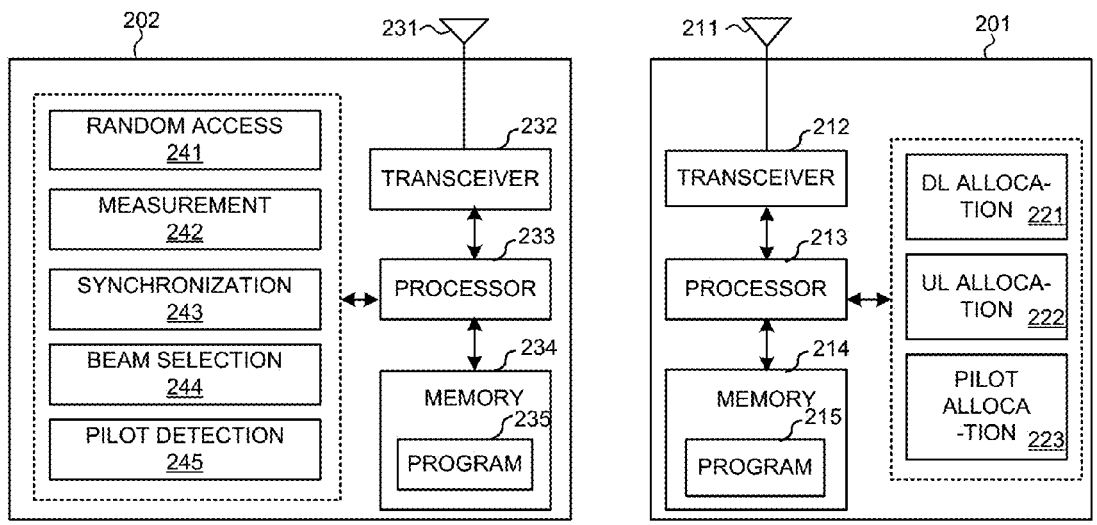
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules that carry out different tasks in accordance with embodiments of the current invention.

The functional modules can be implemented and configured by hardware, firmware, software, and any combination thereof. For example, from BS side, DL allocation module 221 and UL allocation module 222 allocates control radio resource blocks for the control beams, and pilot allocation module 223 allocates radio resources for transmitting pilot signals. Note that the term "allocate" can be an explicit action performed by the BS to configure and reserve certain resource blocks, but it can also be an implicit action of following a predefined agreement based on a standard specification. From UE side, pilot detection module 245 detects pilot signals, extract pilot symbols, and identify control beams from received control beam transmission, beam selection module 244 selects a preferred control beam from received control beam transmission, synchronization module 243 performs time and frequency synchronization with the BS using the selected control beam, measurement module 242 measures radio signals for different control beams and cells, and random access module 241 performs channel access for establishing connection with the BS.

Figure 3:
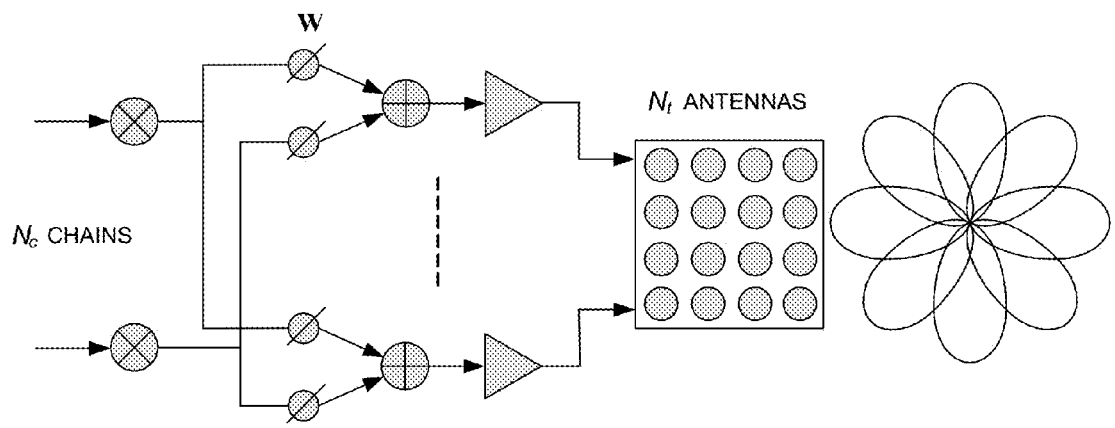
FIG. 3 illustrates beamforming weights applied to multiple antenna elements in a beamforming system.

FIG. 3 illustrates beamforming weights applied to multiple antenna elements in a beamforming system. Through directional antenna technology, complex beamforming weights are adjusted and then applied to the signals transmitted or received by the multiple antenna elements to focus the transmitting or receiving radiation power to the desire direction. The beamforming weights W can be applied in analog domain in the RF chain Nc (e.g., as illustrated in FIG. 3), or applied in digital domain at the baseband (not shown) depending on the transceiver architecture. Multiple sets of complex weights can be applied to the multiple antenna elements Nt, forming one beam at a time or multiple beams simultaneously.

Figure 4:
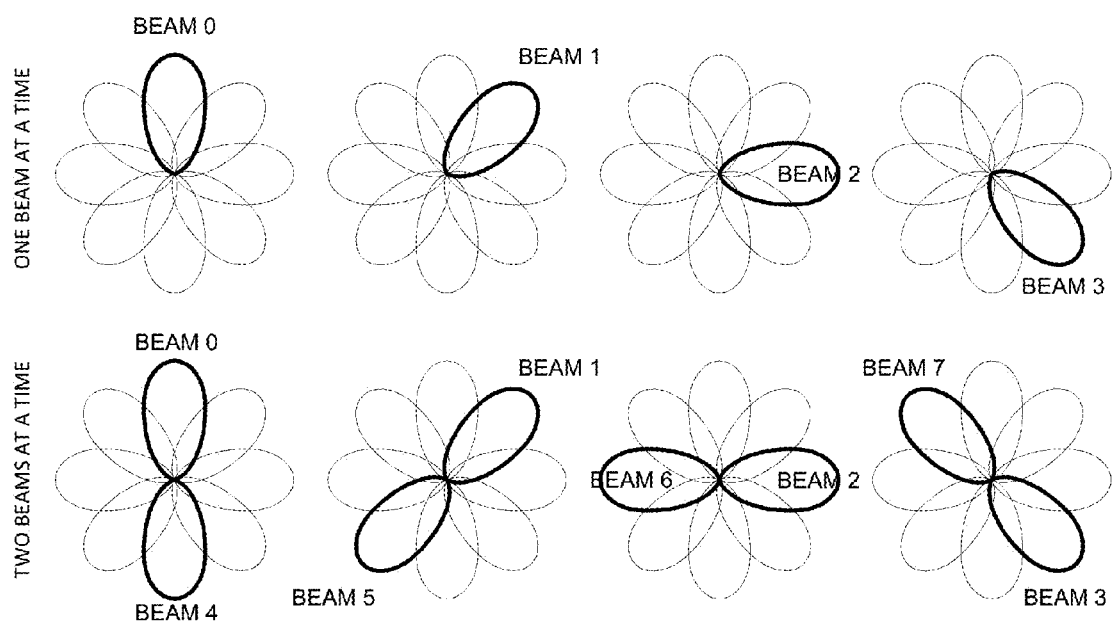
FIG. 4 illustrates multiple sets of beamforming weights applied to antenna elements one beam at a time or two beams at a time.

FIG. 4 illustrates multiple sets of beamforming weights applied to antenna elements to form one beam at a time or two beams at a time. In the top row of FIG. 4, the base station forms one beam at a time by applying one set of weights. Beams 0, 1, 2, and 3 are sequentially formed one at a time. In the bottom row of FIG. 4, the base station forms two beams at a time by applying two sets of weights. Beams 0/4, 1/5, 2/6, and 3/7 are sequentially formed two at a time.

Figure 5:
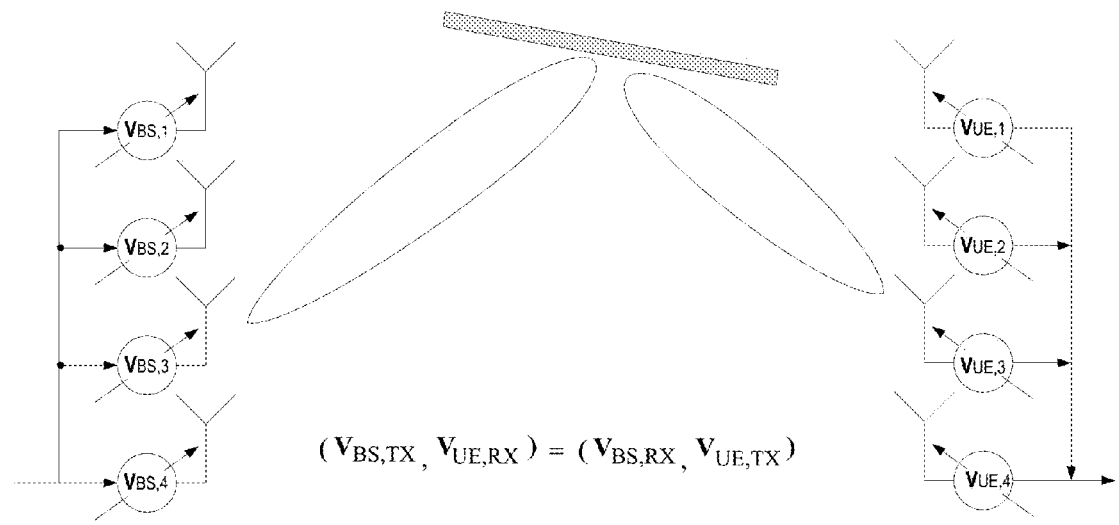
FIG. 5 illustrates spatial reciprocity of DL and UL transmission in a beamforming system.

FIG. 5 illustrates spatial reciprocity of DL and UL transmission in a beamforming system. It is generally assumed that the downlink channel and the uplink channel is spatially reciprocal in the beamforming system. This is typically true for Time division duplex (TDD) systems and for most Frequency division duplex (FDD) systems if the frequency spacing is less than tenth of the total channel bandwidth. Under spatially reciprocal beamforming, the same beamformed antenna pattern is used for reception and transmission. As illustrated in FIG. 5, for downlink transmission, the BS applies TX beamforming vector $V_{BS,TX}$ and the UE applies RX beamforming vector $V_{UE,RX}$. For uplink transmission, the BS applies RX beamforming vector $V_{BS,RX}$ and the UE applies TX beamforming vector $V_{UE,TX}$. Under spatially reciprocal beamforming, the beamforming vectors for downlink and uplink are the same, e.g., $(V_{BS,TX}, V_{UE,RX})=(V_{BS,RX}, V_{UE,TX})$.

Figure 6:
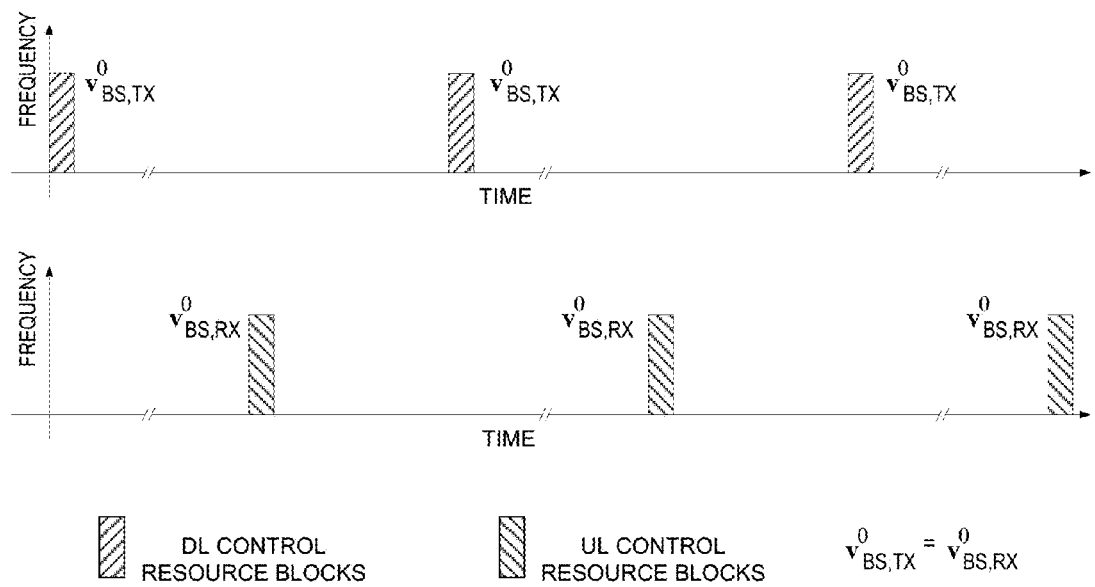
FIG. 6 illustrates control beams in a cell comprising DL control resource blocks and UL control resource blocks.

FIG. 6 illustrates control beams in a cell comprises DL control resource blocks and UL control resource blocks and associated beamforming vectors. As a general concept, a downlink control beam is defined as a set of time-frequency resource blocks in which the base station uses the same beamforming weights set for its downlink transmission to the receiving UEs. The said time-frequency resource blocks, referred to as downlink (DL) control resource blocks, may be periodically configured or occur indefinitely in order known to the UEs. The periodically configured downlink control resource blocks for downlink control beam CB0 is depicted in the top half diagram of FIG. 6, where $V^0_{BS,TX}$ represents the beamforming vector for downlink CB0.

Similarly, an uplink control beam is defined as a set of time-frequency resource blocks in which the base station preferably chooses the same beamforming weights set as the one used by the corresponding DL control resource blocks for its reception of the UEs' uplink transmission. The said time-frequency resource blocks, referred to as uplink (UL) control resource blocks, may be periodically configured or occur indefinitely in order known to the UEs. The periodically configured uplink control resource blocks for uplink control beam CB0 is depicted in the bottom half diagram of FIG. 6, where $V^0_{BS,RX}$ represents the beamforming vector for uplink CB0. Because of spatial reciprocity, the beamforming vectors are the same ($V^0_{BS,TX}=V^0_{BS,RX}$). If the base station chooses not to use the corresponding transmit beamforming weights set as its receive beamforming weights set in the UL control resource block, then it should use a beamforming weights set that achieves better performance than the beamforming weights set associated with the DL control resource blocks.

Figure 7:
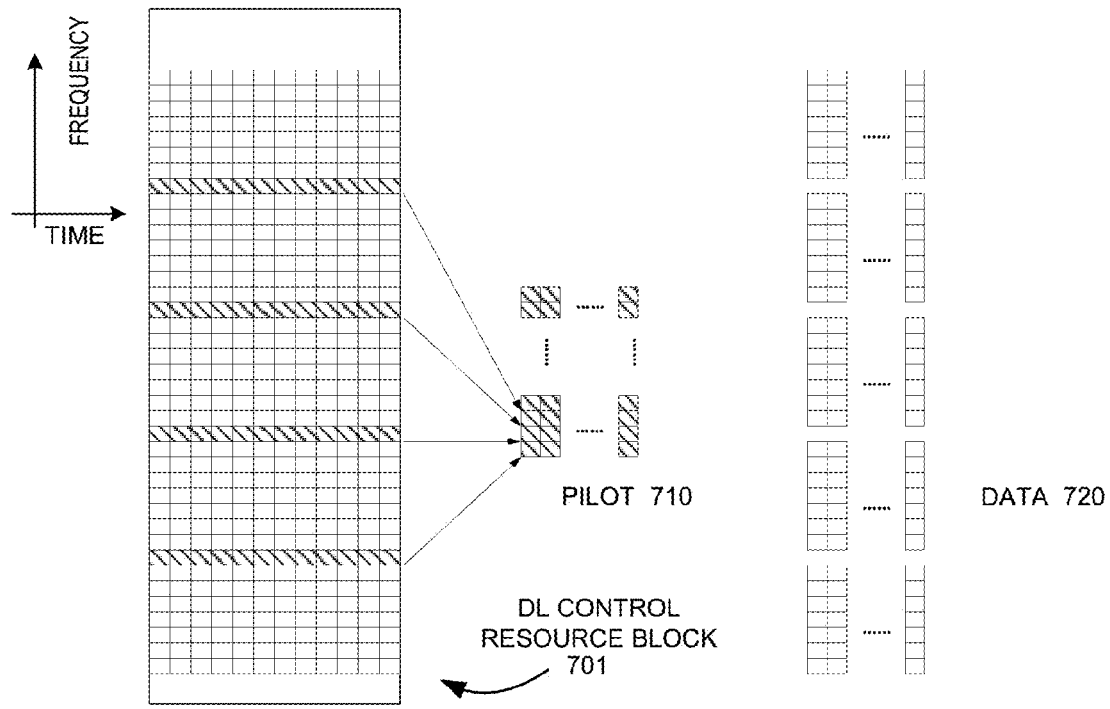
FIG. 7 illustrates one embodiment of DL control resource block associated with a control beam.

FIG. 7 illustrates one embodiment of a DL control resource block associated with a control beam. Each DL control resource block associated with a control beam comprises at least a pilot part and a data part transmitted by the base station. For example, DL control resource block 701 comprises pilot part 710 and data part 720. The pilot part is used for identification of the cell and the control beam, and for time, frequency, and spatial synchronization. The data part is used for cell-specific broadcast, beam-specific broadcast, UE-specific control data, and UE-specific traffic data.

Figure 8:
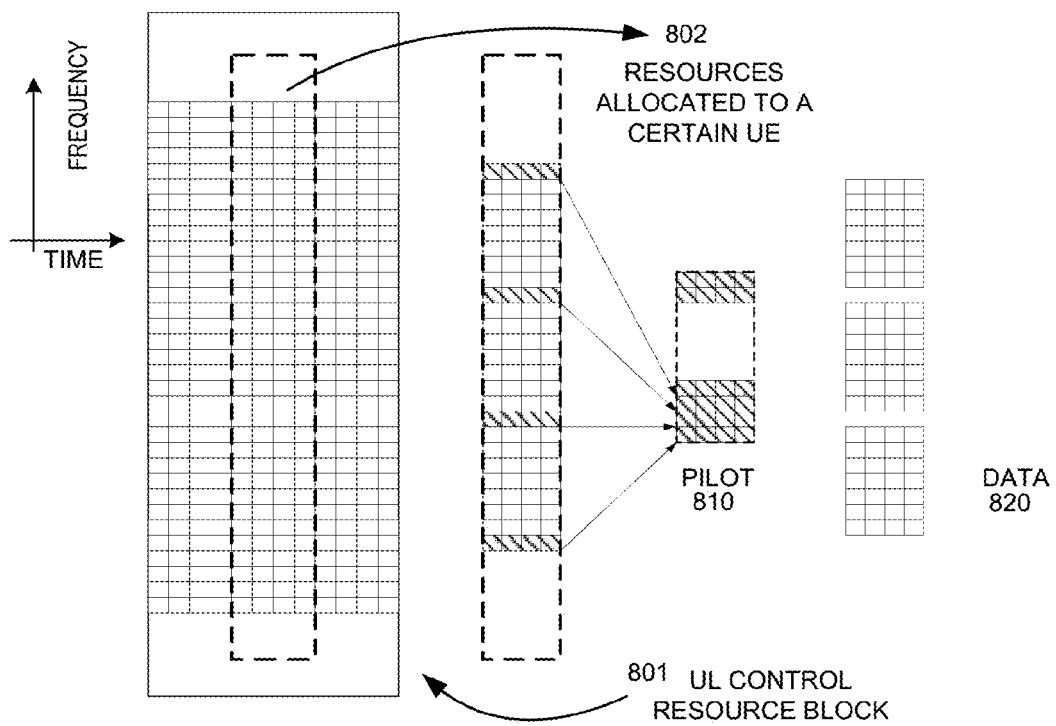
FIG. 8 illustrates one embodiment of UL control resource block associated with a control beam.

FIG. 8 illustrates one embodiment of an UL control resource block associated with a control beam. Each UL control resource block comprises resources allocated to a certain UE. The transmission of a UE in the UL control resource block comprises at least a pilot part and a data part. For example, UL control resource block 801 comprises resources 802 that includes pilot part 810 and data part 820. The pilot part is used for identification of the UE, and for the base station to achieve time, frequency, and spatial synchronization to the UE's uplink transmission. The data part is used for UE-specific control data and UE-specific traffic data.

The transmission of a UE in the UL control resource block may employ transmit beamforming when equipped with multiple antennas. The transmit beamforming weights set used by the UE for the transmitting in the UL control resource block should preferably be the same as the receive beamforming weights set used by the UE for the reception in the preceding DL control resource block with which the UL transmission is associated.

Figure 9:
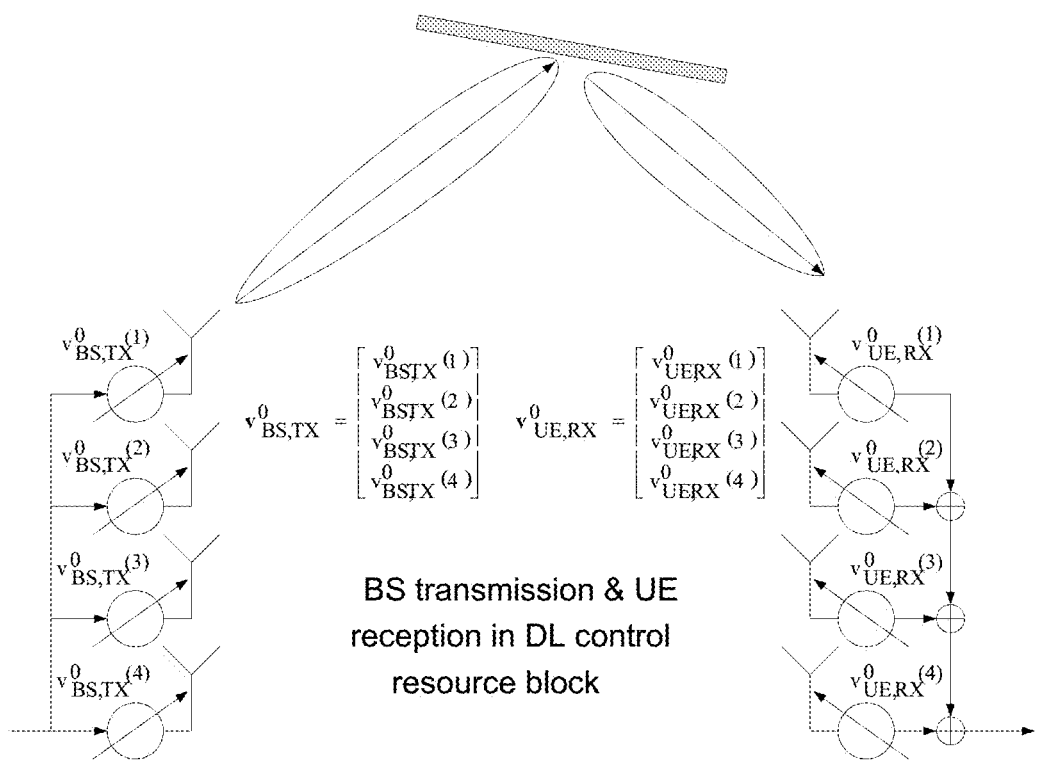
FIG. 9 illustrates BS transmission and UE reception in DL control resource blocks.
Figure 10:
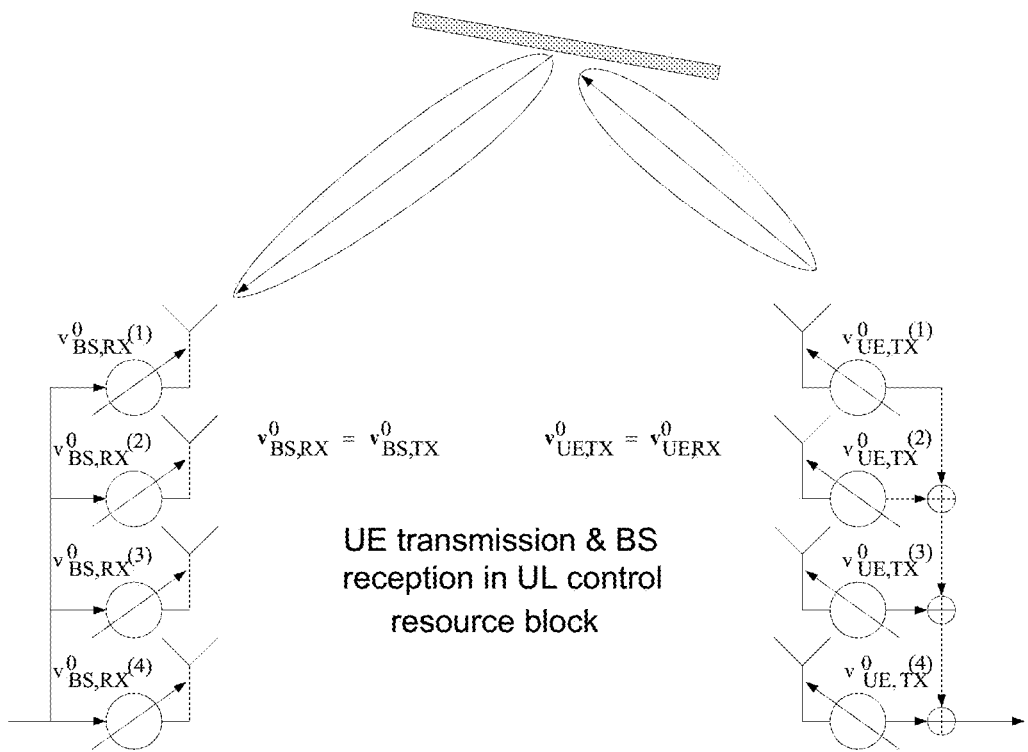
FIG. 10 illustrates UE transmission and BS reception in UL control resource blocks.

FIG. 9 illustrates BS transmission and UE reception in DL control resource blocks. FIG. 10 illustrates UE transmission and BS reception in UL control resource blocks. Under spatially reciprocal beamforming, the same beamformed antenna pattern is used for reception and transmission. As illustrated in FIG. 9, for downlink transmission with control beam CB0, the BS applies TX beamforming vector $V^0_{BS,TX}$ and the UE applies RX beamforming vector $V^0_{UE,RX}$ in DL control resource blocks. As illustrated in FIG. 10, for uplink transmission with CB0, the BS applies RX beamforming vector $V^0_{BS,RX}$ and the UE applies TX beamforming vector $V^0_{UE,TX}$ in UL control resource blocks. Under spatially reciprocal beamforming, the beamforming vectors of control beam CB0 for downlink and uplink are the same, e.g., $V^0_{BS,RX}=V^0_{BS,TX}$ for the base station and $V^0_{UE,TX}=V^0_{UE,RX}$ for the UE.

Figure 11:
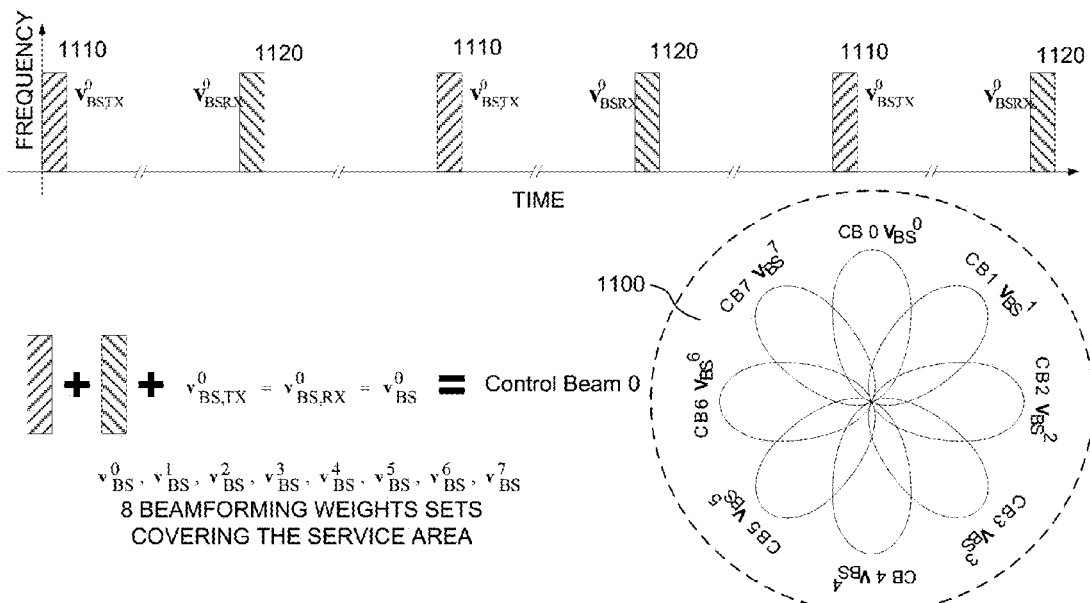
FIG. 11 illustrates control beams in a cell comprising DL and UL control resource blocks and their associated beamforming weights.

FIG. 11 illustrates control beams in a cell comprising DL and UL control resource blocks and their associated beamforming weights. The set of DL and UL control resource blocks and their associated beamforming weights set are collectively referred to as a Control Beam (CB) in a cell. Multiple sets of beamforming weights create radiation patterns covering the entire service area of the cell. One set of DL control resource blocks and one set of UL control resource blocks are associated with each of the beamforming weights set. Each cell has multiple control beams covering its entire service area. In the example of FIG. 11, control beam 0 (CB0) in cell 1100 comprises a set of DL control resource blocks 1110, a set of UL control resource blocks 1120, and a set of corresponding beamforming weights or beamforming vectors ($V^0_{BS,TX}=V^0_{BS,RX}=V^0_{BS}$). The base station allocates eight control beams from CB0 to CB7 for cell 1100. CB0 is associated with beamforming vectors $V^0_{BS}$, CB1 is associated with beamforming vectors $V^1_{BS}$, and so on so forth. The collection of the eight beamforming vectors $V^0_{BS}$ through $V^7_{BS}$ creates a radiation pattern covering the entire service area of the cell.

Figure 12:
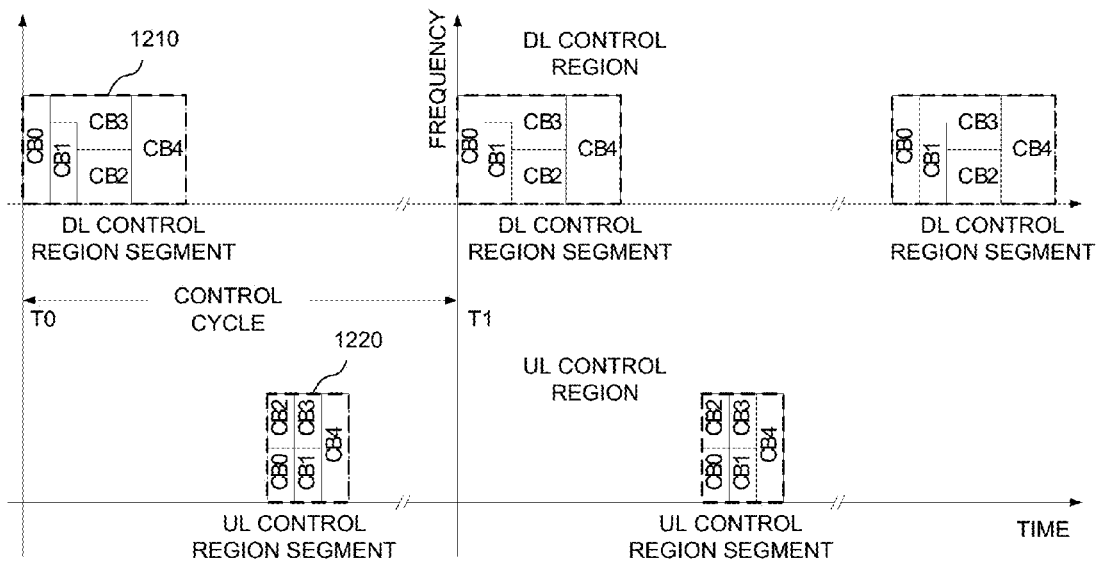
FIG. 12 illustrates control region, control region segment, and control cycle of a control beam.

FIG. 12 illustrates control region, control region segment, and control cycle of a control beam. The collection of all DL control resource blocks associated with all control beams in a cell is referred to as the DL control region of a cell. DL control region may further be divided into DL control region segments. A DL control region segment comprises DL control resource blocks associated with all or part of the control beams in a cell within a certain time period referred to as the control cycle of the cell. Similarly, the collection of all UL control resource blocks associated with all control beams in a cell is referred to as the UL control region of a cell. UL control region may further be divided into UL control region segments. A UL control region segment comprises UL control resource blocks associated with all or part of the control beams in a cell within the control cycle of the cell. There is one DL control segment and one corresponding UL control segment in a control cycle of a cell. The control cycle of the cell may be pre-configured and known to the UEs or dynamically configured and signaled to or blindly detected by the UEs. The control cycle may vary over time.

In the example of FIG. 12, the top half of the diagram depicts the DL control region having three DL control region segments. Each DL control region segment comprises DL control resource blocks for control beams CB0, CB1, CB2, CB3, and CB4. The bottom half of the diagram depicts the UL control region having two UL control region segments. Each UL control region segment comprises UL control resource blocks for control beams CB0, CB1, CB2, CB3, and CB4. A control cycle, e.g., from time T0 to T1, comprises one DL control region segment 1210 and one UL control region segment 1220.

Figure 13:
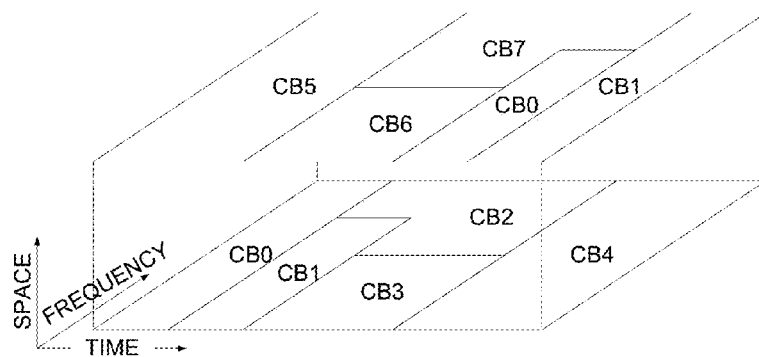
FIG. 13 illustrates control region segment and control resource block configuration.

FIG. 13 illustrates control region segment and control resource block configuration. In the example of FIG. 13, a control region segment comprises control resource blocks for eight control beams from CB0 to CB7. The control region segment can occupy any time-frequency resource blocks hardware allows for each CB. The different CBs can occupy the resource blocks in Time Division Multiplexed (TDM), in Frequency Division Multiplexed (FDM), in Code Division Multiplexed (CDM), in Spatial Division Multiplexed (SPD), or in any combination or mixture of the above multiplexing schemes.

Figure 14:
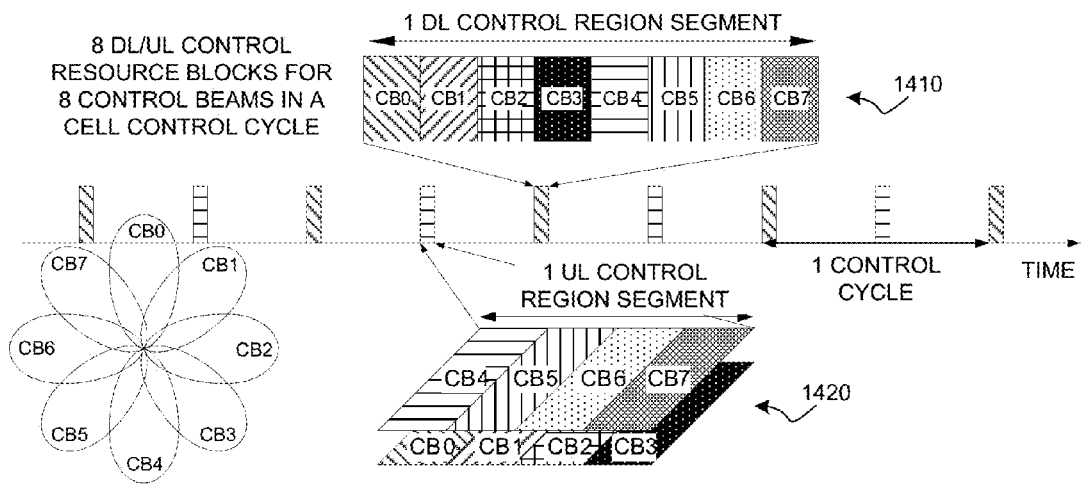
FIG. 14 illustrates a preferred embodiment of DL and UL control resource block configuration.

FIG. 14 illustrates a preferred embodiment of DL and UL control resource block configuration. The configurations for DL control region segment and UL control region segment need not to be the same. In the example of FIG. 14, there are eight DL/UL control resource blocks for eight control beams CB0 to CB7 in a control cycle of a cell. In one DL control region segment, the DL control resource blocks for different control beams are preferably Time Division Multiplexed (TDM) and contiguous in time. As depicted by block 1410, the DL control resource blocks for CB0 to CB7 are multiplexed in time domain. Each control beam transmits at maximum power to reach maximum range. On the other hand, in one UL control region segment, the UL control resource blocks for different control beams are preferably Spatial Division Multiplexed (SDM) in conjunction with other multiplexing schemes when a base station is equipped with multiple RF chains. As depicted by block 1420, the UL control resource blocks for CB0 to CB7 are multiplexed in spatial domain and in time domain. The base station equipped with multiple RF chains can receive multiple beams at the same time, and baseband digital processing can further mitigate inter-beam interference.

Figure 15:
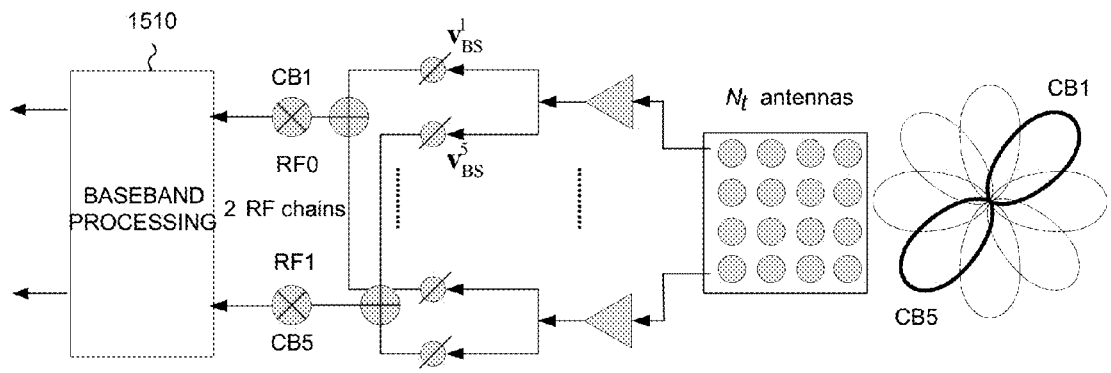
FIG. 15 illustrates an UL receiver having two RF chains for receiving two control beams simultaneously.

FIG. 15 illustrates an UL receiver having two RF chains for receiving two control beams simultaneously. In the example of FIG. 15, a base station is equipped with an RF receiver having two RF chains RF0 and RF1. In UL transmission, the base station receives CB1 and CB5 at the same time via RF0 and RF1, and then processes the received signal using a digital baseband processing module 1510 to mitigate inter-beam interference.

Figure 16A:
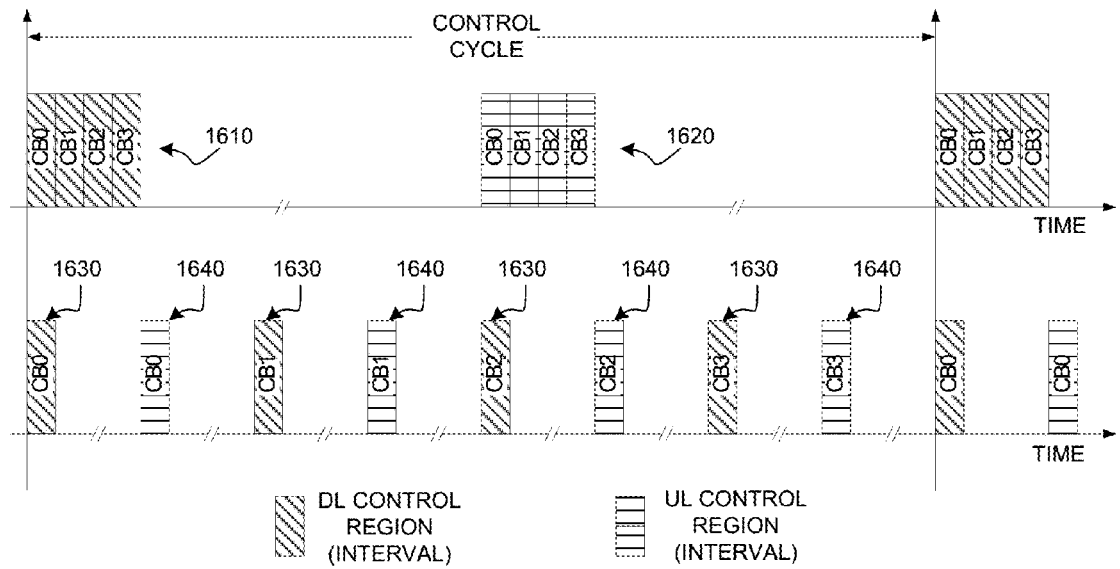
FIG. 16A illustrates embodiments with and without interleaved DL/UL control resource configuration.

FIG. 16A illustrates embodiments with and without interleaved DL/UL control resource configuration. In the top diagram of FIG. 16A, a control cycle comprises one DL control region segment 1610 and one corresponding UL control region segment 1620. DL control region segment 1610 comprises DL control resource blocks for four control beams CB0 to CB3. The DL control resource blocks for the four different control beams are TDMed and contiguous in time. Similarly, UL control region segment 1620 comprises UL control resource blocks for four control beams CB0 to CB3. The UL control resource blocks for the four different control beams are TDMed and contiguous in time. In the bottom diagram of FIG. 16A, a control cycle comprises one DL control region segment 1630 and one corresponding UL control region segment 1640. DL control region segment 1630 comprises DL control resource blocks for four control beams CB0 to CB3. UL control region segment 1640 comprises UL control resource blocks for four control beams CB0 to CB3. The DL control resource blocks and the UL control resource blocks for the four different control beams are TDMed but not contiguous in time. In a special case, the DL and UL control resource blocks are interleaved and alternate in time.

Figure 16B:
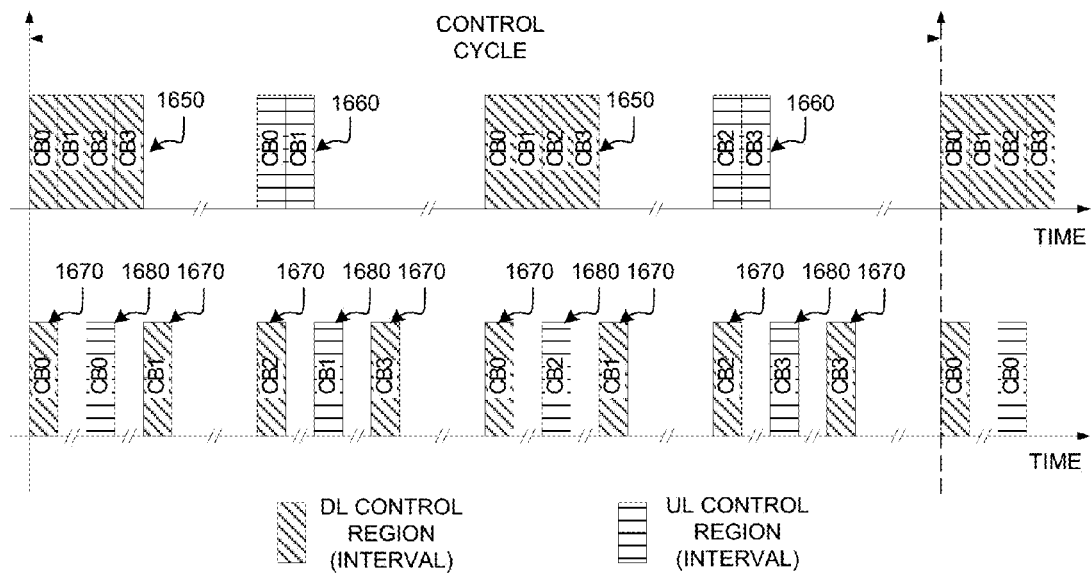
FIG. 16B illustrates one embodiment of control resource configuration with different DL/UL duty cycles.

FIG. 16B illustrates one embodiment of control resource configuration with different DL/UL duty cycles. In the top diagram of FIG. 16B, a control cycle comprises one DL control region segment 1650 and one corresponding UL control region segment 1660. DL control region segment 1650 comprises DL control resources for four control beams CB0 to CB3, which are TDMed and contiguous in time. Each DL control beam appear twice in the control cycle. UL control region segment 1660 comprises UL control resources for four control beams CB0 to CB3, which are TDMed and not contiguous in time. Each UL control beam appear once in the control cycle. As a result, the DL control beams have a shorter duty cycle than the UL control beams. In the bottom diagram of FIG. 16B, a control cycle comprises one DL control region segment 1670 and one corresponding UL control region segment 1680. DL control region segment 1670 comprises DL control resources for four control beams CB0 to CB3. UL control region segment 1680 comprises UL control resources for four control beams CB0 to CB3. The DL control resource blocks and the UL control resource blocks for the four different control beams are TDMed but not contiguous in time. In a special case, every two DL control resource blocks are interleaved by one UL control resource block. As a result, the DL control beams have a shorter duty cycle than the UL control beams.

Figure 17:
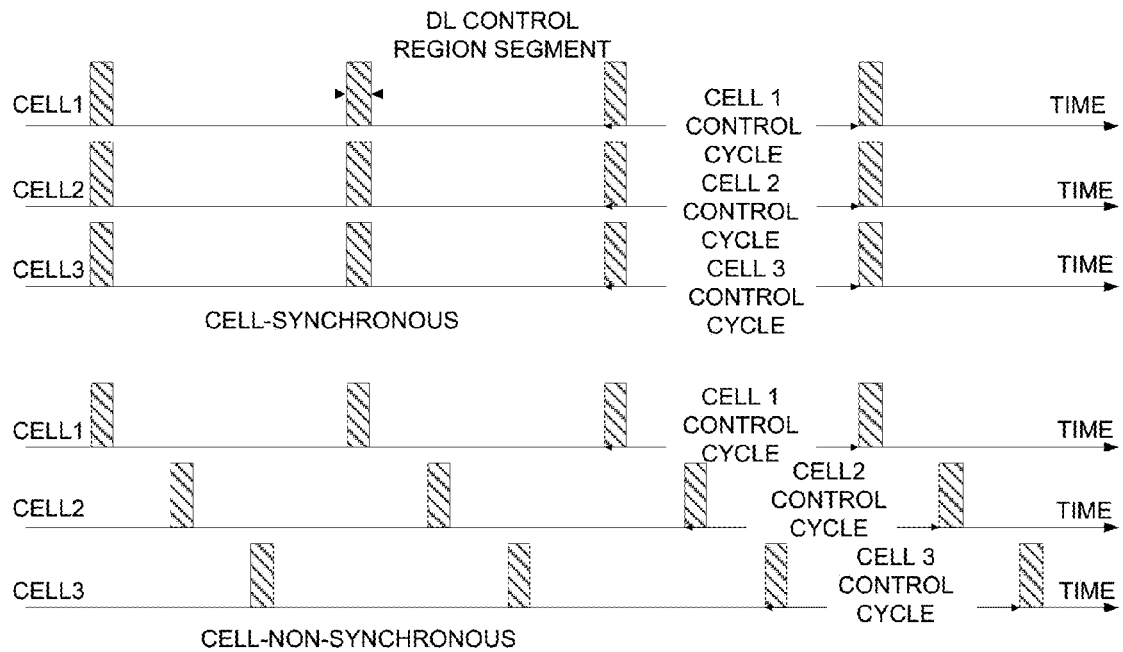
FIG. 17 illustrates embodiments of control cycles for different cells.

FIG. 17 illustrates embodiments of control cycles for different cells. In the top diagram of FIG. 17, the control cycles for different cells are the same, e.g., cell-synchronous. The DL control region segments for cell1, cell2, and cell3 are time-aligned. With cell-synchronous configuration, a UE is able to perform measurements for control beams from different cells during the same control region segment interval. In the bottom diagram of FIG. 17, the control cycles for different cells are different, e.g., cell-non-synchronous. The DL control region segments for cell1, cell2, and cell3 are not time-aligned. With cell-non-synchronous configuration, there is no inter-cell interference between control beams from different cells.

Figure 18:
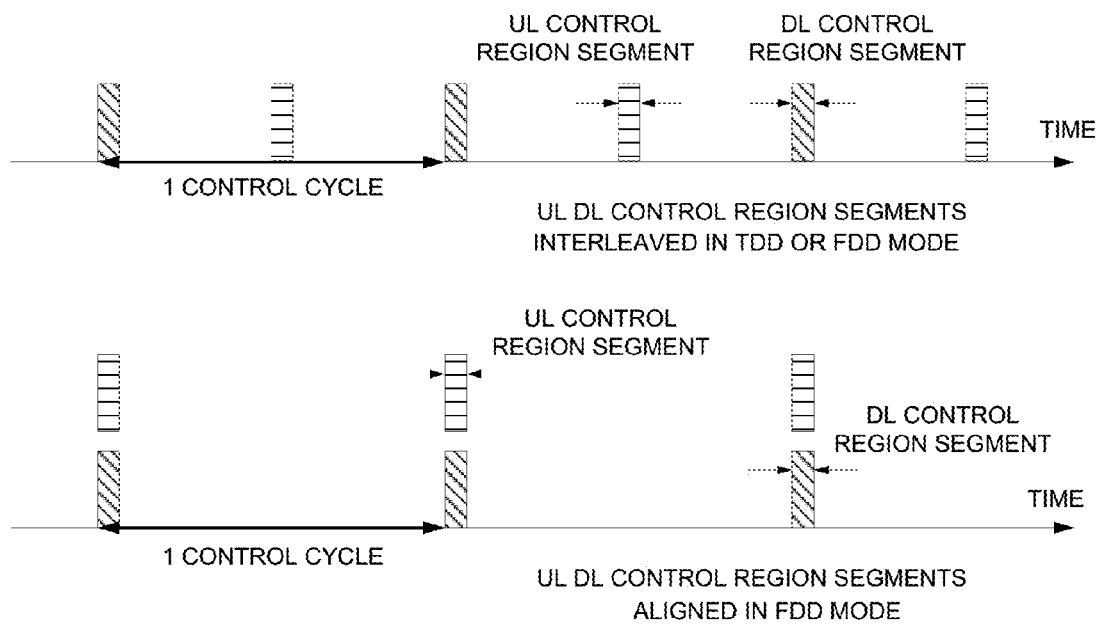
FIG. 18 illustrates embodiments of control cycles in TDD and FDD systems.

FIG. 18 illustrates embodiments of control cycles in TDD and FDD systems. In the top diagram of FIG. 18, the DL control region segments and the UL control region segments are interleaved in time in TDD or FDD mode. In the bottom diagram of FIG. 18, the DL control region segments and the UL control region segments may overlap or aligned in time in FDD mode.

Additional control resource blocks may be configured when the preconfigured resources for control beams are insufficient. For DL control beams, additional DL control resource blocks may be dynamically configured, pre-configured, or implicitly delivered from control beam identification. The addition DL control resource blocks may have a different frame format, e.g., pilot signal is not modulated because it does not need to carry beam ID. For UL control beams, additional UL control resource blocks may be dynamically configured, pre-configured, or implicitly delivered from control beam identification. The additional UL control resource blocks may be allocated for contention based or granted to a designated set of UEs. The additional UL control resource blocks may have a different frame format, e.g., pilot signal is not modulated because it does not need to carry UE ID.

Figure 19:
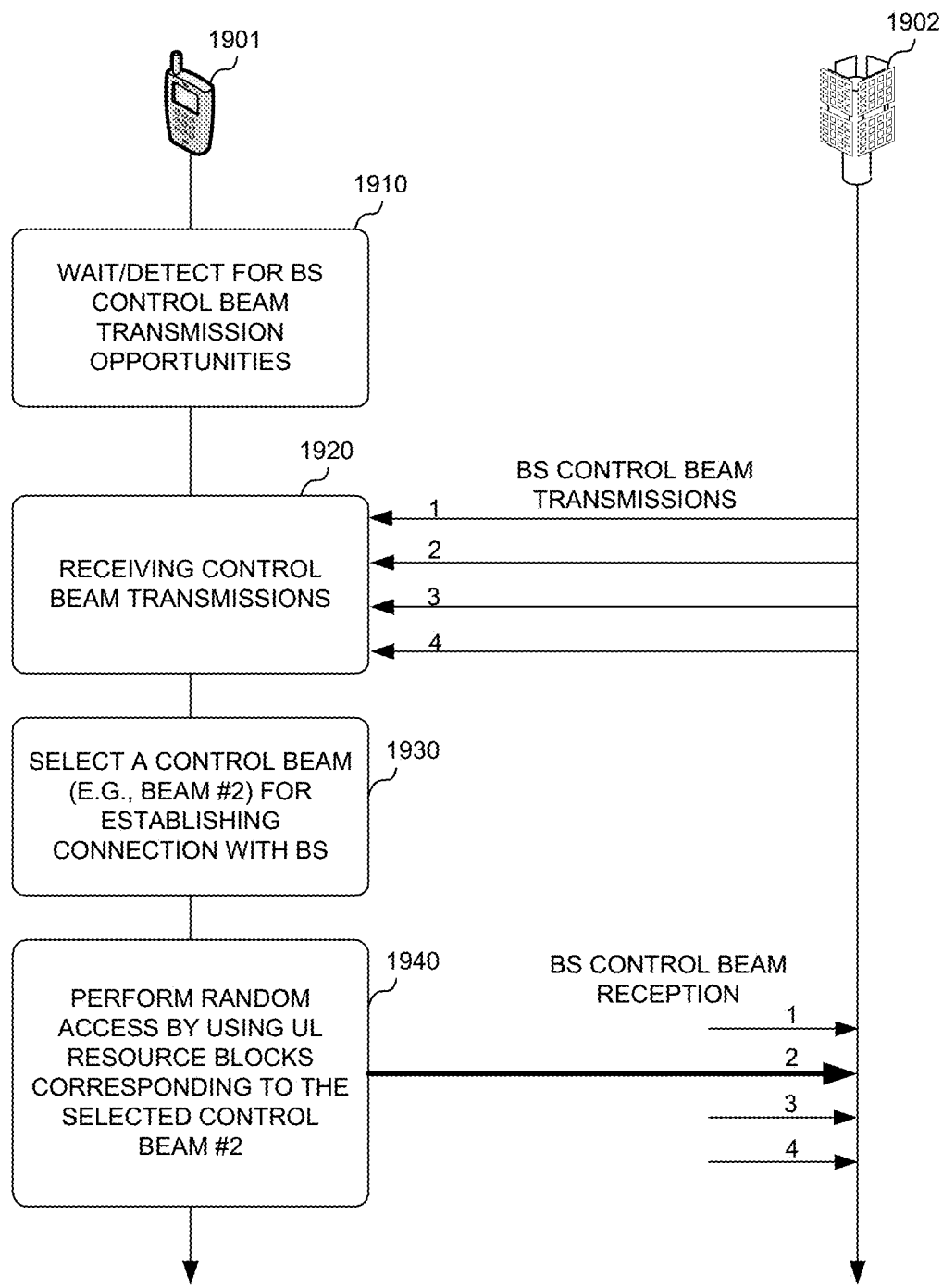
FIG. 19 illustrates a control signaling procedure between a UE and a BS in a beamforming system in accordance with one novel aspect.

FIG. 19 illustrates a control signaling procedure between a UE 1901 and a BS 1902 in a beamforming system in accordance with one novel aspect. In step 1910, UE 1901 tries to establish a connection with BS 1902. UE 1901 waits and detects BS control beam transmission, which are transmitted repeatedly and indefinitely. UE 1901 attempts to achieve time, frequency, and spatial synchronization with BS 1902, and acquiring required broadcast information for accessing the network. In step 1920, UE 1901 receives and detects control beam transmissions from BS 1902. For example, UE 1902 receives and detects four control beam transmissions of CB#1 to CB#4 from BS 1902. In step 1930, UE 1901 selects a control beam, e.g., control beam CB#2 for establishing connection with BS 1902. UE 1901 first performs time and frequency synchronization with BS 1902. Spatial synchronization is achieved after the UE selects the control beam for establishing the connection with the BS. UE 1901 then determines the UL control resources corresponding to the selected control beam CB#2. Moderate array gain is provided via the control beam, which partially compensates severe pathloss in mmWave channel and thus facilitates detection operation at UE. In step 1940, UE 1901 performs random access (RA) on the UL control resources corresponding to the selected control beam CB#2 for carrying essential information to BS 1902 that is required for connection establishment. Via the random access, the BS is aware of which control beam is preferred by the UE. The BS can reach the UE for completing the connection establishment procedure by using the selected control beam. Moderate array gain is provided via the control beam that facilitates BS reception of UE random access. The UL control resources include dedicated resource for random access and thus provide a better-protected UL channel.

Figure 20:
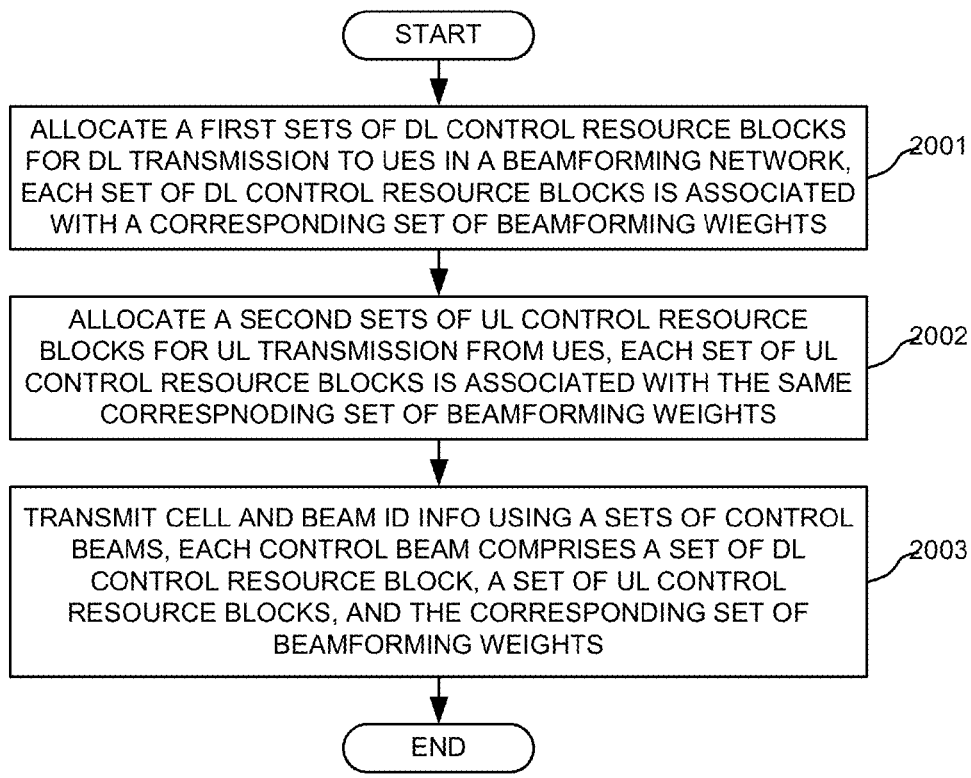
FIG. 20 is a flow chart of a method of control signaling from base station perspective in a beamforming system in accordance with one novel aspect.

FIG. 20 is a flow chart of a method of control signaling from base station perspective in a beamforming system in accordance with one novel aspect. In step 2001, a base station allocates a first sets of DL control resource blocks for DL transmission to a plurality of user equipments (UEs) in a beamforming network. Each set of DL control resource blocks is associated with a corresponding set of beamforming weights. In step 2002, the base station allocates a second sets of UL control resource blocks for UL transmission from the UEs. Each set of UL control resource blocks is associated with the same corresponding set of beamforming weights. In step 2003, the base station transmits cell and beam identification information using a set of control beams. Each control beam comprises a set of DL control resource block, a set of UL control resource block, and the corresponding set of beamforming weights. A collection of the beamforming weights of the set of control beams create a radiation pattern that covers an entire service area of a cell.

Figure 21:
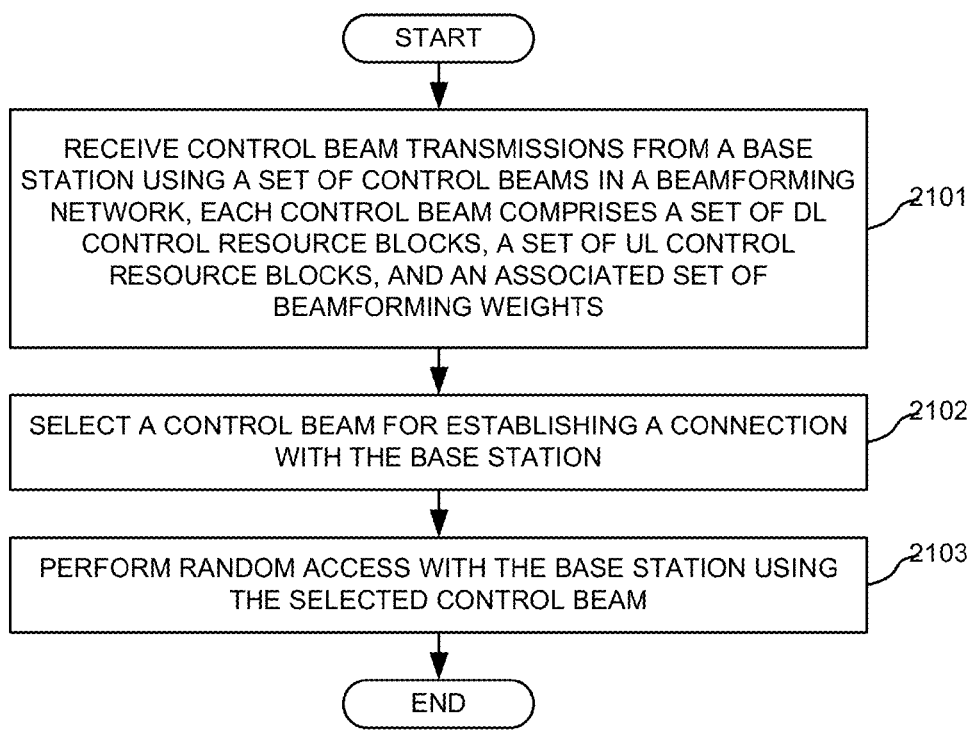
FIG. 21 is a flow chart of a method of control signaling from user equipment perspective in a beamforming system in accordance with one novel aspect.

FIG. 21 is a flow chart of a method of control signaling from user equipment perspective in a beamforming system in accordance with one novel aspect. In step 2101, a user equipment (UE) receives control beam transmission from a base station using a set of control beams in a beamforming network. Each control beam comprises a set of DL control resource blocks, a set of UL control resource blocks, and an associated set of beamforming weights. In step 2102, the UE selects a control beam for establishing a connection with the base station. In step 2103, the UE performs random access with the base station using the selected control beam.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   allocating first sets of downlink (DL) control resource blocks by a base station for DL transmission to a plurality of user equipments (UEs) in a beamforming mobile communication network, wherein each set of the DL control resource blocks is associated with a corresponding set of beamforming weights;
   allocating second sets of uplink (UL) control resource blocks by the base station for UL transmission from the UEs, wherein each set of the UL control resource blocks is associated with the corresponding set of beamforming weights; and
   transmitting cell and beam identification information using sets of control beams, wherein each control beam comprises a set of the DL control resource blocks, a set of the UL control resource blocks, and the corresponding set of beamforming weights.

2. The method of claim 1, wherein a collection of the corresponding set of beamforming weights create a radiation pattern that covers an entire service area of a cell.

3. The method of claim 2, wherein the base station allocates the sets of control beams to cover the entire service area of the cell.

4. The method of claim 1, wherein the first sets of DL control resource blocks and the associated sets of beamforming weights form a DL control region, and wherein the second sets of UL control resource blocks and the associated sets of beamforming weights form an UL control region.

5. The method of claim 4, wherein the DL control region is divided into DL control region segments in time domain, and where the UL control region is divided into UL control region segments in time domain.

6. The method of claim 5, wherein a control cycle includes one DL control region segment and one corresponding UL control region segment, and wherein the DL and UL control region segments are repeatedly configured for each control cycle along time domain.

7. The method of claim 5, wherein the DL control resource blocks for different control beams in a DL control region segment are Time Division Multiplexed (TDM) and contiguous in time domain.

8. The method of claim 5, wherein the DL control resource blocks for different control beams in a DL control region segment are Time Division Multiplexed (TDM) and interleaved with the UL control resource blocks in time domain.

9. The method of claim 5, wherein the UL control resource blocks for different control beams in an UL control region segment are Spatial Division Multiplexed (SDM).

10. The method of claim 5, wherein the DL control resource blocks and the UL control resource blocks have different duty cycle.

11. The method of claim 5, wherein the control resource blocks for different control beams in a control cycle occupies time-frequency resource blocks based on at least one of Time Division Multiplexing, Frequency Division Multiplexing, Code Division Multiplexing, and Spatial Division Multiplexing.

12. The method of claim 5, wherein the control cycle for different cells are aligned in time domain.

13. The method of claim 5, wherein the DL control region and the UL control region are interleaved along time domain in Time Division Duplex (TDD) systems.

14. The method of claim 5, wherein the DL control region and the UL control region are overlapped along time domain in Frequency Division Duplex (FDD) systems.

15. The method of claim 1, wherein the DL control resource blocks comprises a pilot part and a data part, and wherein the pilot part is used for transmitting the cell and beam identification information.

16. A base station, comprising:
a downlink resource allocation circuit that allocates first sets of downlink (DL) control resource for DL transmission to a plurality of user equipments (UEs) in a beamforming mobile communication network, wherein each set of the DL control resource blocks is associated with a corresponding set of beamforming weights;
an uplink resource allocation circuit that allocates second sets of uplink (UL) control resource blocks for UL transmission from the UEs, wherein each set of the UL control resource blocks is associated with the corresponding set of beamforming weights; and
a radio frequency (RF) transmitter that transmits cell identification and beam identification information using sets of control beams, wherein each control beam comprises a set of the DL control resource blocks, a set of the UL control resource blocks, and the corresponding set of beamforming weights.

17. The base station of claim 16, wherein a collection of the corresponding beamforming weights create a radiation pattern that covers an entire service area of a cell.

18. The base station of claim 17, wherein the base station allocates the sets of control beams to cover the entire service area of the cell.

19. The base station of claim 16, wherein the first sets of DL control resource blocks and the associated sets of beamforming weights form a DL control region, and wherein the second sets of UL control resource blocks and the associated sets of beamforming weights form an UL control region.

20. The base station of claim 19, wherein the DL control region is divided into DL control region segments in time domain, and where the UL control region is divided into UL control region segments in time domain.

21. The base station of claim 20, wherein a control cycle includes one DL control region segment and one corresponding UL control region segment, and wherein the DL and UL control region segments are repeatedly configured for each control cycle along time domain.

* * * * *